Feb. 26, 1924.
M. H. MOSES
EXTENSIBLE CLAMP
Filed Sept. 13, 1922
1,484,794
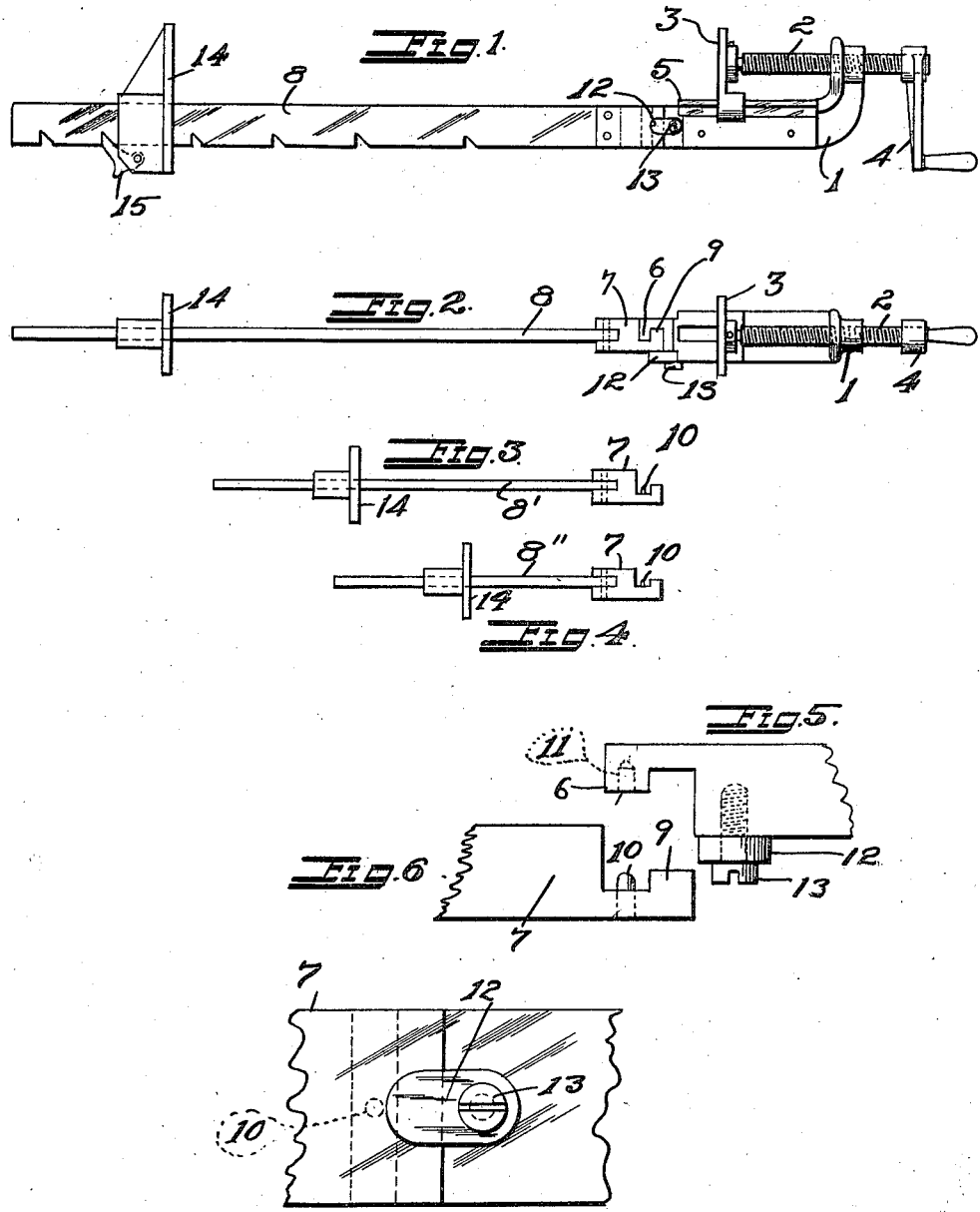
INVENTOR
Max H. Moses.
BY
Carlos P. Griffin
ATTORNEY.

Patented Feb. 26, 1924.

1,484,794

UNITED STATES PATENT OFFICE.

MAX H. MOSES, OF SAN FRANCISCO, CALIFORNIA.

EXTENSIBLE CLAMP.

Application filed September 13, 1922. Serial No. 587,954.

*To all whom it may concern:*

Be it known that I, MAX H. MOSES, a citizen of the United States, residing at San Francisco, in the county of San Francisco, State of California, have invented a new and useful Extensible Clamp, of which the following is a specification in such full and clear terms as will enable those skilled in the art to construct and use the same.

This invention relates to an extensible clamp, the object of the invention being to provide a worker with clamps of a series of different lengths applicable to a given screw head, thereby making the clamp more convenient for use, and eliminating the cost of several screw heads, one screw head being usable with a series of different length bars.

Other objects of the invention will appear as the description proceeds.

An embodiment of the invention is shown in the accompanying drawings in which the same reference numeral is applied to the same portion throughout, but I am aware that there may be modifications thereof.

Fig. 1 is a side elevation of the complete clamp with the entire bar in place,

Fig. 2 is a plan view of the complete clamp,

Fig. 3 is a plan view of the shorter bar,

Fig. 4 is a plan view of the still shorter bar,

Fig. 5 is a plan view of one side of the clamp connection,

Fig. 6 is a plan view of the bar end of the clamp connection, and

Fig. 7 is an enlarged side elevation of the joined ends of the bar and clamp head on a slightly larger scale than Fig. 1.

The clamp consists of an L shaped member 1, through the shorter leg of which is threaded a screw 2. This screw bears upon the clamp member 3 and has the crank 4 for turning it. The clamp member 3 is grooved to slide upon a flat bar 5 secured on the top of the longer leg of the member 1.

At the end of the member 1 it is grooved so that flange 6 is produced. This member then fits a head 7 secured to another bar 8. The head 7 is grooved so that its flange 9 fits into the groove adjacent the flange 6. The pin 10 which passes into a hole 11 in the flange 6 prevents the parts from moving vertically, (Fig. 1) and the turn button 12 secured to the member 1, by means of a screw 13 holds the parts together.

The bar 8 carries a clamp member 14, which is adjusted to different positions along said bar and holds it in any given adjustment by means of the pawl 15 which engages notches in the under-side of the bar 8.

In Figs. 3 and 4 there are shown two different lengths of bars each of which has a head 7 applied thereto. These bars 8' and 8" are of different lengths and are used in the place of the bar 8 whenever it is desired to make use of shorter bars on smaller work.

The clamp operates substantially the same as all other clamps of this character and the extension bar used therewith corresponds with the size of the work to which it is to be applied.

The bar is taken off by turning the turnbutton 12 and a bar of the desired length is then applied to the clamp member 1.

What I claim is as follows, but various modifications may be made in the construction shown in the drawings and above particularly described form, within the purview of my invention.

A clamp comprising a short beam, a leg at one end of same, a screw threaded through said leg, a clamp jaw swivelly engaged by said screw and slidably mounted on said beam, the opposite end of said beam having a groove and a flange extending entirely across one side face, a detachable beam member having a complemental flange and groove extending entirely across one side face at one end thereof, whereby to permit rapid lateral interlocking coupling and uncoupling of the first named beam and the detachable beam, cooperating means carried by the first beam and the detachable beam for preventing relative transverse sliding movement of the respective beams, a lock pivotally mounted on one of said beams to prevent lateral separation thereof at their interlocked ends, and a clamp jaw movable along the detachable beam.

In testimony whereof I have hereunto set my hand this 6th day of September, A. D. 1922.

MAX H. MOSES.